July 20, 1937. G. L. HILL Re. 20,450

HIGH TENSION FUSE

Original Filed July 9, 1923 2 Sheets-Sheet 1

INVENTOR.
George Leslie Hill.
BY
Townsend, Loftus & Abbett
ATTORNEYS.

July 20, 1937. G. L. HILL Re. 20,450

HIGH TENSION FUSE

Original Filed July 9, 1928 2 Sheets-Sheet 2

INVENTOR.
George Leslie Hill.
BY
Townsend, Loftus & Abbott
ATTORNEYS.

Reissued July 20, 1937

Re. 20,450

UNITED STATES PATENT OFFICE 20,450

HIGH TENSION FUSE

George L. Hill, Oakland, Calif.

Original No. 2,056,189, dated October 6, 1936, Serial No. 508,029, January 12, 1931, which is a division of application July 9, 1928, Serial No. 291,214. Application for reissue May 24, 1937, Serial No. 144,554

49 Claims. (Cl. 200—120)

My present invention relates to high tension electric cut-outs and more particularly to fuses of the so-called expulsion type, the present application being a division of my co-pending application entitled "High tension fuse", filed July 9th, 1928, Serial Number 291,214.

An object of my invention is to produce an improved form of high tension fuse which will readily interrupt the circuit upon the occurrence of an excessive overload or the like and efficiently extinguish any arc established during the operation.

Another object of my invention is to provide a fuse of the above type with liquid arc extinguishing features which will operate positively and efficiently without danger to the fuse supporting structure.

A further object of my invention is to provide in a fuse of the above character, means whereby the arc when established by reason of interruption of the circuit by the fuse, will be drawn into a zone under the direct action of the arc extinguishing liquid and be blown out thereby.

Another object of the present invention is to provide a high tension fuse device in which the fuse element has a plurality of fusible or separable portions so as to produce a primary and a secondary arc and utilizing the energy of the first or primary arc to extinguish the second or secondary arc through the medium of a suitable arc quenching or extinguishing material.

Another object of my invention is to provide in a fuse of the above type an arrangement whereby the arc extinguishing liquid will not only function to extinguish any arc established but will also function to force the adjacent ends of the fuse apart to thereby draw out the arc during the extinguishing period.

A further object of my invention is to provide an arrangement whereby a tube of glass or other fragile material may be used as a portion of the fuse body without being subjected to internal pressures and fractures, as is the case with fuses of this type now on the market.

Another object of my invention is to provide in a fuse of the above character, means whereby any arc established by the fuse will be retained in a reinforced compartment in the presence of an arc extinguishing liquid.

Other objects and advantages will be obvious to those skilled in the art and others will be hereinafter more specifically pointed out.

For the purpose of illustrating my invention, I have in the accompanying drawings illustrated several embodiments of my invention, but it should be understood that these drawings are to be taken as illustrating rather than limiting my invention.

In these drawings—

In the drawings I show several distinct embodiments of my invention and for the purpose of explanation I shall discuss my invention separately in connection with each sheet of the drawings, it being understood that like numerals throughout the several views refer to like parts.

Figure 1:
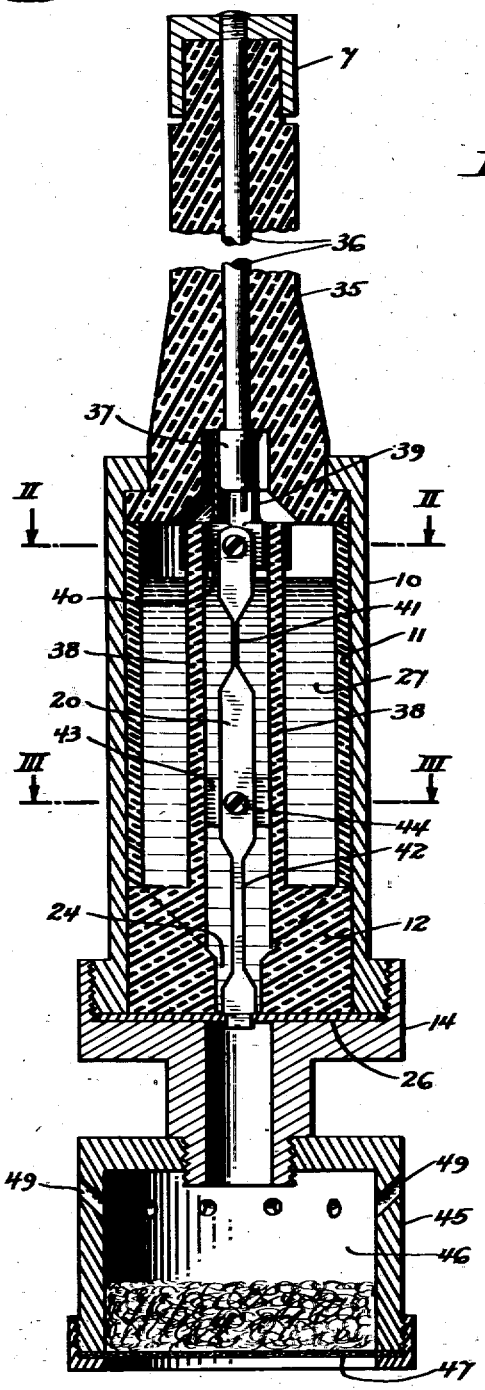
Fig. 1 is a sectional view of a fuse embodying the features of my invention.
Figure 2:
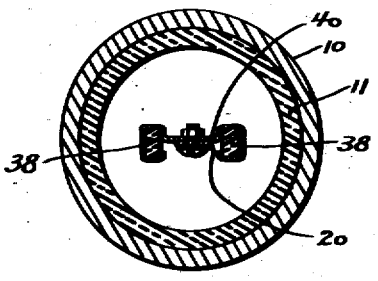
Fig. 2 is a sectional view of the fuse shown in Fig. 1, said section being taken on line II—II of Fig. 1 looking in the direction of the arrows.
Figure 3:
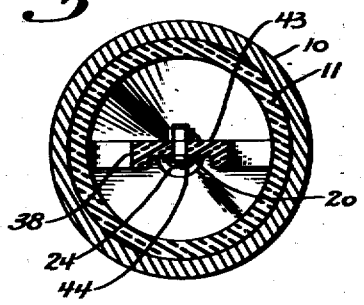
Fig. 3 is a view similar to Fig. 2 taken on line III—III of Fig. 1.

In the drawings, 10 designates a tubular metallic member which forms a reinforcing housing about what I shall term the expulsion chamber of the fuse. The expulsion chamber is formed within an insulating lining tube 11 and the expulsion chamber contains an arc extinguishing material or liquid such as indicated at 27 and a fuse element generally indicated at 20. The lower end of the housing 10 is threaded to receive a ferrule 14, this ferrule forming a support for a fragile disc 26 and a reinforcing head 12; the disc 26 forming a closure for the lower end of the expulsion chamber while an elongated insulator 35 forms a closure for the upper end of the expulsion chamber.

Extending through the insulating member 35 is a rod 36 on the outer end of which is formed a suitable contact making ferrule 7, while on the inner end is formed a contact making head 37. The reinforcing head 12 at the lower end of the expulsion chamber is provided with two upstanding parallel supports 38 which extend substantially to the top of the expulsion chamber. At the upper ends of these supports there is provided a metallic connector clip 39 adapted to slidably engage the contact head 37 of the rod 36. The connector clip is provided with means for securing it to the ends of the supports 38 and has a web 40 therebetween to which the fuse 20 is attached. The fuse is shown as having two reduced portions, one portion 41 at the upper end thereof which is adapted to fuse under an excessive current flow and the second reduced portion 42 at a point adjacent the lower end which is adapted to break under the combined fusing and stretching action caused by the expulsion of the liquid 27 within the expulsion chamber when the fusible portion 41 is fused and the fragile plate 26 disrupted. In order to provide for tension upon the fuse portion 42 when the fusible portion is fused, I provide a web 43 of insulating material between the members 38 and secure the fuse thereto by means of a screw 44. The head member 12 is provided with a discharge orifice 24 through which the arc extinguishing liquid or material, together with a portion of the fuse, is expelled during blowing of the fuse.

As an additional feature of invention I have shown in connection with this fuse a means for catching the molten metallic parts blown out of the fuse when it operates. This means comprises a housing member 45, constructed of any suitable material, but preferably of metal, as shown, which is secured to the ferrule 14 by any suitable means and provides a chamber 46 in communication with the orifice 24. The housing 45 is provided across its lower face with a closure means of metallic screen 47 and within the housing so formed and resting on the screen 47 I contemplate providing a quantity of metallic wool. This arrangement will insure against the escape of metallic particles from the fuse to the surrounding atmosphere and the metallic wool will also act to rapidly cool any gases and liquid which may escape therethrough. As an additional means of venting the chamber 46 there may also be provided suitable openings 49 at the upper part of the chamber.

The operation of this embodiment of my invention is as follows: When the fuse is subjected to an excessive current, the fusible portion 41 of the fuse will burn away. This will create an explosion in the expulsion chamber, and as a result, the diaphragm 26 will be ruptured and thus impose upon the weakened portion 42 of the fuse a tension which will cause it to also break. The breaking of the portion 42 will, as will be evident, establish a second arc in the lower part of the expulsion chamber and within the zone of the orifice 24 where it will be readily blown out and extinguished.

After a fuse of this type has operated to open the circuit the problem of re-fusing can be conveniently carried on by removing the ferrule 14 which will permit the withdrawal of the member 12 together with the fuse supporting members 38 so that the fuse together with the new diaphragm 26 may be conveniently mounted thereupon and reinserted in its operating position. The removable parts may be referred to as the re-fill or renewable cartridges and may be inserted as a whole or parts may be renewed as conditions require. The cartridge or re-fill referred to are the elements 26, 12, 11, 38, 20, 39, together with the arc extinguishing medium.

On Sheet 2 of the drawings I illustrate a modification of the invention. This modified structure is constructed in substantially the same manner as that shown in Fig. 1, with the exception that a plug member 50 is in this case made as a separate unit from the fuse and connects with a suitable clip 53, which, in turn, is connected to a terminal member 54 upon which the fuse is mounted. A fuse constructed in accordance with this embodiment of my invention possesses characteristics of the form of the invention shown in Fig. 1 in that a second arc is established in the zone of the orifice 24a where it will come under the direct arc extinguishing action of the liquid 27a. When the fuse 20a melts from an excessive current and an arc is formed in the circuit, a pressure will be produced within the expulsion chamber which is sufficient to rupture the fragile disc 26a with the result that the plug 50 will be blown out through the orifice 24a and out of contact with the clip 53 so that a second arc will be established at this point.

Figure 4:
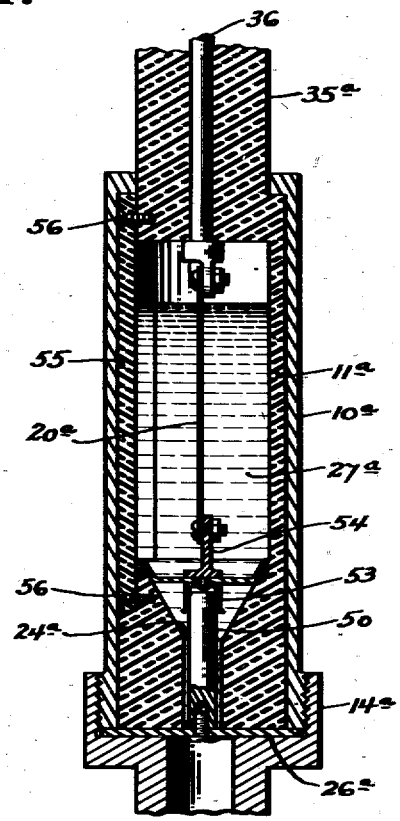
Fig. 4 shows a modification of the fuse, said view being in section.

In order to renew the fuse 20a of the structure shown in Fig. 4 it is only necessary to remove the ferrule 14a and then by sliding the housing member 10a upwardly the upper terminal or fuse support will be exposed so that a fuse can be readily applied. The reinforcing tube 11a may be tubular and separate from the upper member 35a or it may be made a part thereof as shown in Fig. 4 and provided with a closure plate 55 on one side so as to permit access to the interior for the purpose of renewing the fuse. This closure member is secured in place by means of screws 56.

Figure 5:
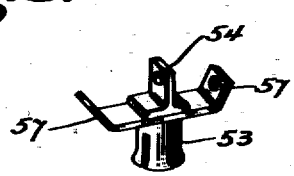
Fig. 5 is a perspective view of a detail of the fuse shown in Fig. 4.

In Fig. 5 of the drawings I have shown in perspective a detail view of the clip 53 and fuse terminal 54. As here shown, these members are supported on a bracket 57 which is flared at the ends so as to fit within the conical portion of the aperture 24a where it is secured by any suitable means.

In the drawings, for the purpose of simplifying the same and to prevent confusion, I have shown the expulsion chamber as only partially filled with an arc extinguishing liquid, but I desire to have it understood that I contemplate a complete filling of the fuse in some instances. I desire also to point out the fact that when the fuse is completely filled with an arc extinguishing material or liquid it will operate with equal satisfaction in either a vertical or horizontal position, or, in fact, at any desired angle, and while I have shown two forms of my invention it is to be understood that various changes may be made within the scope of the appended claims.

Having thus described my invention, what I claim and desire to secure by Letters Patent is—

1. In a high tension fuse, means for establishing a preliminary arc and thereafter a main arc, and means actuated by pressure produced by the first arc for projecting an arc extinguishing medium into the main arc.

2. In a high tension fuse, a fuse element having a section of small current carrying capacity to form a preliminary arc, and a second section of greater current capacity to form a second arc, and means actuated by gases under pressure formed by said first arc for projecting an arc quenching medium into the second arc formed in the remaining section of the fuse.

3. In a fuse device of the expulsion type, a fuse supporting member having terminals at the ends thereof, a fuse extending between said terminals having fusible portions connected in series, a closed compartment formed in the fuse supporting member adapted to surround the fusible portions of said fuse and contain an arc extinguishing substance, a fragile diaphragm at one end of said compartment adapted to be ruptured by pressure exerted from within said compartment due to the fusing of one of the fusible portions and permit the corresponding end of the fusible element and the arc extinguishing substance to be blown out of said compartment, whereby any arc established within the compartment will be also established at said second fusible portion and brought under the direct action of said arc extinguishing substance in its discharge from said compartment.

4. In a high tension fuse of the expulsion type, the combination of a relatively long body member of insulating material having a reinforced expulsion chamber at one end thereof adapted to contain an arc extinguishing substance, a fusible conductor mounted within said expulsion chamber adapted to be fused by a predetermined current, a fragile diaphragm adapted to be connected to one of the terminals of the fuse element and be ruptured by pressure exerted from within said compartment to permit discharge of the arc extinguishing substance, and a mechanically weakened connector for connecting said diaphragm with said fuse whereby the latter will be broken as said diaphragm is ruptured to thereby draw the arc into the opening produced by the rupture of said diaphragm and under the arc extinguishing action of the substance in its discharge from said compartment.

5. In a high tension fuse of the expulsion type, the combination of a relatively long body member of insulating material having a reinforced expulsion chamber at one end thereof adapted to contain an arc extinguishing substance, a fusible conductor mounted within said expulsion chamber adapted to be fused by a predetermined current, a fragile diaphragm adapted to be connected to one of the terminals of the fuse element and be ruptured by pressure exerted from within said compartment to permit discharge of the arc extinguishing substance, means connecting said diaphragm with said fuse adapted to be blown outwardly under the influence of pressure exerted from within said expulsion chamber, and means arranged externally of said diaphragm adapted to catch the molten metallic particles thrown out of said chamber under the influence of said pressure.

6. In a fuse device of the expulsion type, the combination of a fuse supporting body having a compartment formed therein, a fusible element mounted within said compartment and having a plurality of fusible portions connected in series, anchor means between the fusible portions, an expellable member forming a closure for one end of the compartment and adapted to be expelled by pressure exerted from within said compartment, and means whereby the adjacent end of the fuse element will be pulled out of the compartment when the expellable member is expelled.

7. In a fuse device of the expulsion type, the combination of a fuse supporting body having a compartment formed therein, a fusible element mounted within said compartment and having a plurality of fusible portions connected in series, anchor means between the fusible portions, an arc extinguishing medium in the compartment and covering the fusible element, an expellable member forming a closure for one end of the compartment and adapted to be expelled by pressure exerted from within said compartment, and means whereby the arc extinguishing medium will be expelled and the adjacent end of the fuse element will be pulled out of the compartment when the expellable member is expelled whereby any arc established will be drawn out and extinguished by said arc extinguishing medium in its discharge from the compartment.

8. In a fuse device of the expulsion type, the combination of a fuse supporting body having a compartment formed therein, said compartment terminating in a discharge orifice, an arc extinguishing medium in the compartment, a fusible element mounted within said compartment and having a plurality of fusible portions, an expellable member adjacent the discharge orifice and forming a closure for the compartment and adapted to be expelled by pressure exerted from within said compartment, and means whereby the arc extinguishing medium will be expelled and the adjacent end of the fuse element will be pulled out from the compartment when the expellable member is expelled whereby any arc established will be drawn out through the discharge orifice and extinguished by said arc extinguishing medium in its discharge from the compartment.

9. In a high tension fuse, a housing having terminal members at opposite ends adapted to receive a renewable fuse cartridge, said cartridge comprising a shell, a head member at one end having an expulsion passage formed therein, a fuse element and an arc extinguishing medium within the shell, said fusible element having a plurality of fusible portions, an expulsion member forming a sealed closure for the expulsion passage, and means for connecting the fuse with the terminal members of the housing when the cartridge is inserted therein.

10. In a fuse device of the expulsion type, a fuse supporting member having terminals at the ends thereof, a fuse extending between said terminals and having fusible portions, and a closed compartment adapted to surround the fusible portions of the fuse and containing an arc extinguishing medium, an expulsion member forming a closure for one end of the compartment and adapted to be expelled by pressure exerted from within said compartment due to the fusing of one of the fusible portions of the fuse and permitting the adjacent end of the fusible element to be blown out of said compartment whereby any arc established within the compartment will also be established at said second fusible portion and brought under the direct action of said arc extinguishing substance in its discharge from said compartment.

11. In a high tension fuse, means in the fuse adapted to form an arc during blowing of the fuse, means whereby the energy of said arc is utilized to establish a second arc, and means whereby the energy of the first arc is utilized to extinguish the second arc.

12. In a high tension fuse, a fusible element adapted to form an arc during blowing of the fuse, means whereby the energy of said arc is utilized to establish a second arc, and means whereby the energy of the first arc is utilized to extinguish the second arc.

13. In a high tension fuse, a renewable fuse cartridge comprising a shell having a compartment formed therein containing a fuse with a plurality of fusible portions, and an arc extinguishing substance surrounding the fuse, said compartment being sealed with an expellable member, and a housing to receive the cartridge and to connect the cartridge in an electric circuit.

14. A high tension renewable fuse cartridge comprising a shell having a compartment formed therein containing a fuse with a plurality of fusible portions, and an arc extinguishing substance surrounding the fuse, a head member forming a closure for one end of the cartridge, and a second head member forming a closure for the opposite end of the cartridge, said second head having a discharge orifice formed therein to retain the arc extinguishing substance within the cartridge, said sealing member also functioning as a conducting member in an electric circuit established through the fuse cartridge.

15. In a high tension fuse, a supporting body for the reception of a fuse cartridge, said body having a discharge opening formed therein, and terminals connected with the cartridge and said cartridge having a compartment formed therein containing a fuse with a plurality of fusible sections, and an arc extinguishing substance, said compartment being sealed with a member which is expellable through the discharge opening.

16. A fuse device comprising a body member having a chamber formed therein, a fusible element having fusible portions, one of greater and one of lesser current carrying capacity, disposed in the chamber and connected with current carrying terminals at each end, an anchor member in the chamber and connected with the fusible element at a point intermediate the fusible portions, and an arc extinguishing substance in the chamber.

17. A fuse device comprising a body member having a chamber formed therein, a fusible element having fusible portions, one of greater and one of lesser current carrying capacity disposed in the chamber and connected with current carrying terminals at each end, an anchor member in the chamber and connected with the fusible element at a point intermediate the fusible portions, an arc extinguishing substance in the chamber, and means actuated by pressure produced by the arc of the lesser current carrying capacity portion of the fuse when it fuses to cause a mechanical break between the greater current carrying capacity portion of the fuse and the anchor member.

18. In a high tension fuse, the combination of a supporting body, a renewable fuse cartridge insertable therein, means in the cartridge adapted to form an arc, means whereby the energy formed by said arc is utilized to establish a second arc, and means whereby the energy of the first arc is utilized to aid in extinguishing the second arc.

19. In a high tension fuse device, an expulsion tube, a fusible element within the tube, said element having a plurality of fusible sections connected in series, and a metallic chamber forming a continuation of said tube, said chamber acting as a receptacle for expelled parts from the fuse device.

20. In a high tension fuse device, an expulsion tube, a fusible element within the tube, said element having a plurality of fusible sections, a metallic chamber forming a continuation of said tube, said chamber acting as a receptacle for expelled parts from the fuse device, and metallic means for rapidly cooling the hot expelled gases.

21. In a high tension fuse device, an expulsion tube, a fusible element within the tube, said element having a plurality of fusible sections, a metallic chamber forming a continuation of said tube, said chamber acting as a receptacle for expelled parts from the fuse device, metallic means for rapidly cooling the hot expelled gases, and means for allowing escape of the cooled gases.

22. In a high tension fuse device, an expulsion tube, a fuse element within the tube, said tube being closed at one end and being provided with an expulsion orifice of reduced diameter with respect to the tube at the opposite end, and a metallic chamber forming a continuation of the expulsion end of said tube, said chamber acting as a receptacle for expelled parts of the fuse device.

23. In a high tension fuse, a body member having a chamber formed therein, a fuse element in said chamber having a section of small current carrying capacity to form a preliminary arc and a second section of greater current carrying capacity to form a second arc, an arc quenching medium in the chamber and surrounding the fuse element, and means actuated by the gas under pressure formed by said first arc for projecting the arc quenching medium into the second arc formed in the remaining section of the fuse.

24. In a high tension fuse, a body member having a chamber formed therein, a fuse element in said chamber, means in said fuse adapted to form an arc during blowing of the fuse, means whereby the energy of said arc is utilized to establish a second arc, and means whereby the energy of the first arc is utilized to extinguish the second arc.

25. In a high tension fuse, a body member having a chamber formed therein, a fuse element in said chamber, an arc extinguishing substance surrounding the fuse element, means in the fuse adapted to form an arc during blowing of the fuse, means whereby the energy of said arc is utilized to establish a second arc, and means whereby the energy of the first arc is utilized to project the arc quenching medium into the second arc to extinguish the second arc.

26. In a high tension fuse, a fuse element having a section of small current carrying capacity to form a preliminary arc, and a second of greater current carrying capacity, said greater current carrying capacity portion of the fuse being attached to an expellable member and adapted to be pulled apart by the expellable member when it is expelled by pressure generated during blowing of the small current carrying capacity portion of the fuse.

27. In a high tension fuse, a fuse element having a low strength and a high strength fusible portion, said high strength portion being attached to an expellable member and adapted to be pulled apart by the expellable member when it is expelled by pressure generated during blowing of the low strength portion of the fusible element.

28. In a high tension fuse, a renewable fuse cartridge comprising a shell having a compartment formed therein for the reception of a fuse element having fusible sections, one of greater and one of lesser current carrying capacity, said fuse sections being connected in series, and an arc extinguishing substance.

29. In a fuse device, a housing adapted to receive a renewable fuse cartridge, said cartridge comprising an insulated shell with a terminal member in one end of the shell, an expellable terminal member in the other end of the shell, and a fuse element within the shell having a plurality of fusible sections, said fuse element completing the connection between the terminal members.

30. In a fuse device, a housing adapted to receive a renewable fuse cartridge, said cartridge comprising an insulated shell with a terminal member in one end of the shell, an expellable terminal member in the other end of the shell, and a fuse element within the shell having two fusible portions, said portions being connected to the respective terminal members and also connected to each other.

31. In a fuse device, a housing adapted to receive a renewable fuse cartridge, said cartridge comprising an insulated shell with a terminal member in one end of the shell, an expellable terminal member in the other end of the shell, a fuse element within the shell having a plurality of fusible sections, said fuse element completing the connection between the terminal members, and an arc extinguishing substance in the shell.

32. In a fuse device, a housing adapted to receive a renewable fuse cartridge, said cartridge comprising an insulated shell with a terminal member in one end of the shell, an expellable terminal member in the other end of the shell, a fuse element within the shell having two fusible portions, said portions being connected to the respective terminal members and also connected to each other, and an arc extinguishing substance in the shell.

33. In a high tension fuse device, a member of insulating material having a chamber formed therein adapted to contain a fuse element having fusible portions, and an arc extinguishing substance, said chamber being sealed with an expellable member, and a metallic member surrounding the insulating member whereby forces set up during blowing of the fuse may be sustained.

34. In a high tension fuse device, of the expulsion type, a renewable fuse cartridge for insertion in the fuse device, said cartridge comprising an insulated tube with a metallic conductor in one end of the tube and an expellable metallic conductor in the other end of the tube, a fuse element having a plurality of fusible portions within the tube, one fusible portion connected to one metallic conductor and another fusible portion connected to the other metallic conductor, and means connecting the fusible portions.

35. In a circuit interrupting device, a sealed chamber in the device, an arc extinguishing substance in the chamber, means for establishing a preliminary arc and thereafter a main arc in the chamber, and means actuated by pressure produced by the first arc for projecting the arc extinguishing substance into the main arc.

36. In a circuit interrupting device, a sealed chamber adapted to contain an arc extinguishing substance, means for forming two arcs in succession within said chamber, and means whereby pressure created by the first arc forces the arc extinguishing substance into the path of the second arc.

37. In a circuit interrupting device, a chamber forming a part of the device, an arc extinguishing substance in the chamber, means for placing the arc extinguishing substance under a predetermined pressure, means for releasing the arc extinguishing substance into the path of an arc in the circuit interrupting device at the predetermined pressure, to aid in interrupting the circuit.

38. In a circuit interrupting device, a chamber forming a part of the device, a passage in communication with said chamber, means for drawing an arc in said passage, an arc extinguishing substance in said chamber, means for placing the arc extinguishing substance under a predetermined pressure, and means for releasing said arc extinguishing substance into the path of the arc in said passage.

39. In a circuit interrupting device, a sealed chamber, a restricted passage forming an exit from said chamber, an arc extinguishing substance in the chamber, means for creating a pressure in said chamber, means for establishing an arc in said restricted passage, and means whereby the pressure created in said chamber will force the arc extinguishing substance from said chamber through said passage into the path of said arc.

40. In a circuit interrupting device, a housing, a fuse and arc extinguishing substance in said housing adapted to generate pressure when the fuse blows, a pair of contacts in said housing arranged to be separated by said pressure, and means whereby the arc extinguishing substance is forced between the contacts when they are separated by the pressure.

41. In a circuit interrupting device, a fuse and an arc extinguishing substance adapted to generate pressure when the fuse blows, a stationary contact adjacent said fuse, a movable contact adapted to be separated from said stationary contact by said pressure, and means for interposing said arc extinguishing substance between said stationary and said movable contacts.

42. In a high tension fuse device, an expulsion tube having metallic end terminals mounted thereon, a fusible element within the tube, said fusible element having a plurality of fusible sections, and a chamber formed within an extension of one of the metallic end terminals, said chamber acting as a receptacle for expelled parts from the fuse device.

43. In a high tension fuse device, an expulsion tube having metallic end terminals mounted thereon, a fusible element within the tube, said fusible element having a plurality of fusible sections, and an enlarged metallic chamber formed within an extension of one of the metallic end terminals, said chamber acting as a receptacle for expelled parts from the fuse device.

44. In a high tension fuse device, an expulsion tube, a fusible element within the tube, said element having a plurality of fusible sections, a chamber forming a continuation of said tube, said chamber acting as a receptacle for expelled parts from the fuse device, and means for rapidly cooling the hot expelled gases.

45. In a high tension fuse device, an expulsion tube, a fusible element within the tube, said element having a plurality of fusible sections, a chamber forming a continuation of said tube, said chamber acting as a receptacle for expelled parts from the fuse device, means for rapidly cooling the hot expelled gases, and means for allowing escape of the cooled gases.

46. In a high tension fuse device, an expulsion tube, a fuse element with a plurality of fusible sections within the tube, said tube being closed at one end and being provided with an expulsion orifice of reduced diameter with respect to the tube at the opposite end, and a chamber forming a continuation of the expulsion end of said tube, said chamber acting as a receptacle for expelled parts of the fuse device.

47. In a high tension fuse device, an expulsion tube, a fusible element within the tube, said element having a plurality of fusible sections connected in series, and a chamber forming a continuation of said tube, said chamber acting as a receptacle for expelled parts from the fuse device.

48. In a high tension fuse device, an expulsion tube, a fuse element within the tube, said tube being closed at one end, and the other end forming the expulsion end of the tube; and a metallic chamber forming a continuation of the expulsion end of the tube, said chamber acting as a receptacle for expelled parts of the fuse device.

49. In a high tension fuse device, an expulsion tube, a fuse element within the tube, said tube being closed at one end and the other end forming the expulsion end of the tube; a metallic chamber forming a continuation of the expulsion end of the tube, said chamber acting as a receptacle for expelled parts of the fuse device, and metallic cooling means in the chamber to rapidly cool hot expelled gases.

GEORGE L. HILL.